Figure 1:
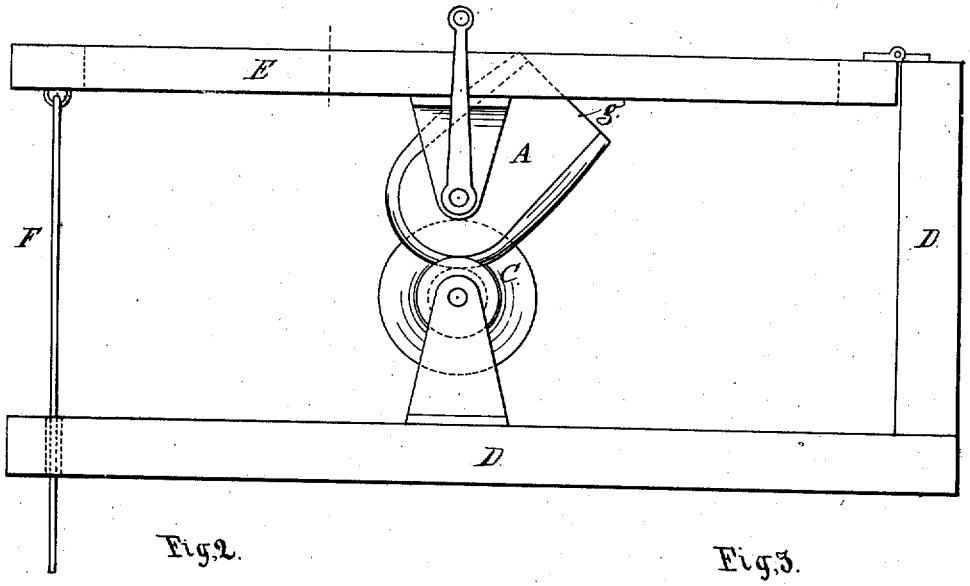
Figure 2:
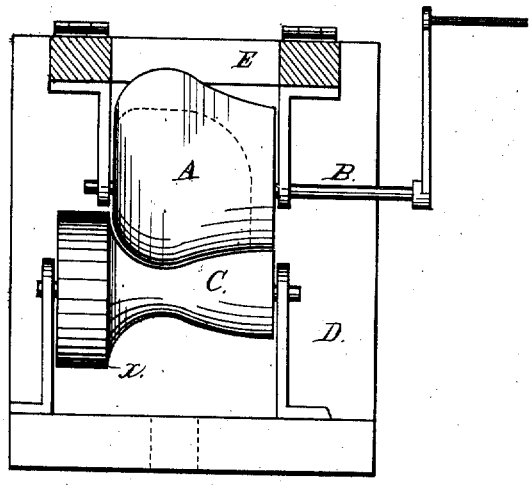

2 Sheets--Sheet 1.

J. R. MOFFITT.

Manufacture of Heel-Stiffeners for Boots and Shoes.

No. 6,162. Reissued Dec. 8, 1874.

Witnesses

Geo. T. Smallwood Jr.

John J. Roby

Inventor.

J. R. Moffitt

2 Sheets--Sheet 2.

J. R. MOFFITT.

Manufacture of Heel-Stiffeners for Boots and Shoes.

No. 6,162. Reissued Dec. 8, 1874.

Witnesses

Geo. T. Smallwood Jr.

John Roby.

Inventor.

J. R. Moffitt

UNITED STATES PATENT OFFICE.

JOHN R. MOFFITT, OF CHELSEA, MASSACHUSETTS.

IMPROVEMENT IN THE MANUFACTURE OF HEEL-STIFFENERS FOR BOOTS AND SHOES.

Specification forming part of Letters Patent No. 127,090, dated May 21, 1872; reissue No. 6,162, dated December 8, 1874; application filed November 23, 1874.

*To all whom it may concern:*

Be it known that I, JOHN R. MOFFITT, of Chelsea, State of Massachusetts, have invented an Improved Heel-Stiffener or Counter for Boots and Shoes, and a new Process and Machinery for Making the same; and I do hereby declare that the following, taken in connection with the drawing which accompanies and forms part of this specification, is a description of my invention sufficient to enable those skilled in the art to practice it.

In molding to shape ready-made counters or stiffeners for heels of boots and shoes made of various materials, but usually of waste bits of leather, a difficulty exists, by reason of the peculiar shape required, in getting an equal or sufficient pressure upon all parts of such counter, so as to insure uniform hardness throughout, and also a further difficulty in getting a true and proper permanent form throughout all parts, because the material will differ in character in different parts of the same counter, some of it, especially in leather, being of a more spongy nature than other parts. This difference or lack of homogeneity prevents a uniform solidity, and precludes the true preservation of the shape which a mold may impart.

Figure 4:
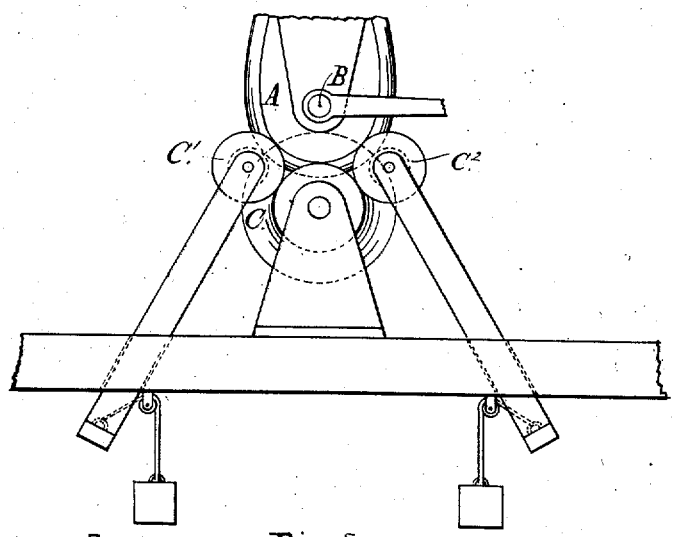
Figure 5:
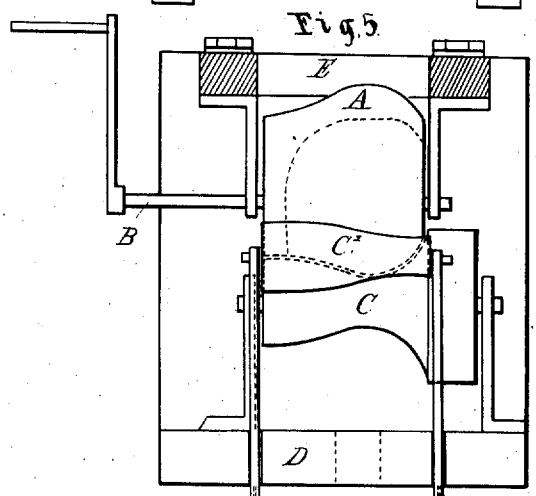

The object of my invention is not only to make more perfect ready-made shaped counters than can be made by any molding process, but to make a rolled counter, prepared, solidified, and uniformly hardened and set to shape by a rolling pressure, such rolling action producing a better article, and admitting of producing the same from material hitherto found too intractable, such as leather-board, sheet metal, &c. Instead, therefore, of shaping the stiffener in a mold, I employ no mold of any kind, but use a moving former, A, devised by me, of a shape adapted to give the desired shape to the counter, and set on a shaft, B, the shaft being arranged to have a continuous or a reciprocating rotary movement, either by hand or by power, as desired. Beneath this former I place supports or rollers, C, $C^1$, and $C^2$, (see Figs. 4 and 5,) each having a profile, as shown, the converse of and conforming to that of the former. The shaft of the former has its bearings in a swing-frame, E. F is a treadle-strap, whereby the swing-frame may be pulled down to give any required degree of pressure, and which also permits the former to rise and fall as in its movements it rides and rolls over the surface of the counter, the counter-piece being placed centrally upon the former, and being rubbed and rolled as well as squeezed between them while being brought to shape. If leather-board or pulpy material be used, the roll and the former should be of metal in order to give the counter the proper firmness throughout its whole body or surface. If leather or bits of leather pasted or united together (commonly known as "pancake") be used, then the roller former, or both, should be of rubber or other material capable of yielding to some extent to adapt itself to the different thickness of the leather, but not yielding enough to prevent the proper compression and compacting of the leather.

Figure 3:
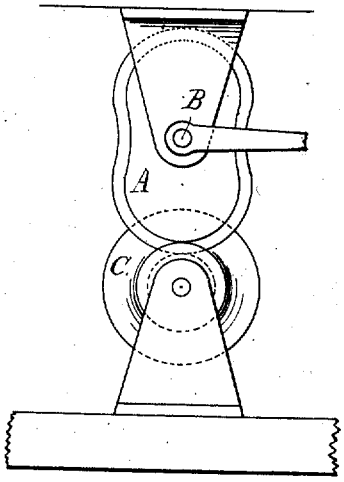

In operating the apparatus, the piece of the counter, being properly cut or prepared, is placed on the former, and, by hand or machinery, a reciprocating rotary motion of something less than an entire revolution is given to its shaft, so as to bring the most or all of the operating surface of the former into action. This action is continued as long, and the amount of pressure given should be as great, as the character of the material being operated upon, or the exigencies of the case may demand. The end *g* of the former need not be a plane, as shown in Fig. 1, but instead may be rounded at its opposite end, as shown in Fig. 3, so that it may be continuously revolved and in either direction. Each of the rolls $C^1$ $C^2$ has a yielding support by means of a spring or weight, whereby it may, as the former revolves or moves, be forced up against the material being rolled to shape, and serves to hold it close against the former, the weights or springs allowing such auxiliary rolls to recede as the motion of the former may demand.

The roll or rolls may be made up, if desired, of a series of rings instead of being solid.

My rolling action operates upon the material being formed in a manner quite different from a mere squeezing and crimping action. By my method of treatment the whole surface is rolled, and consequently, as nearly as may be, equally treated, and the particles of the blank are not simply pressed by a pressure in only one or two lines of direction, whereby a part of the stock shall be greatly compressed and the greater portion of it compressed but little, if any, but, on the contrary, the rollers act on all parts coming between their peripheries, and in addition give a rubbing and drawing action upon the heel-seat or flange, and around the angle or curve which it makes with the body of the counter. The effect of this is that as the former turns it presses forward the particles which compose the material, tends to alter their relative positions, and to give them a new set by the progressive pressure imparted to them; and the repeated rollings, whether continuously in the same direction or first in one and then in the other direction, tend to intensify and confirm this set, resulting in the production of a counter superior to any heretofore known to me, and having new characteristics, such as greater fixedness of shape, greater smoothness of surface, more uniformity of character and compactness throughout, and the almost entire avoidance of perceptible puckers or crimps.

Figure 6:
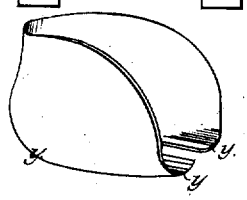

Fig. 6 represents a shaped stiffener for a boot or shoe heel.

I claim—

1. In a machine for making counters or stiffeners for boots and shoes, a turning or revolving former, in combination with mechanism for holding and shaping the blank over it.

2. The revolving or turning counter-former A, in combination with a supporting roll or rolls for rolling, or for rolling and flanging blank-stock into heel-stiffeners, substantially as shown and described.

3. The process described of forming the heel-seat of a counter by means of a former having a motion about a center, and which gives to the heel-seat a drawing or rubbing action against a flange or bearing surface, in addition to the rolling action.

JOHN R. MOFFITT.

Witnesses:

GEO. T. SMALLWOOD, Jr.,
JOHN ROBY.